US005978208A

United States Patent [19]

Helms et al.

[11] Patent Number: 5,978,208

[45] Date of Patent: Nov. 2, 1999

[54] CIRCUIT BREAKER ARRANGEMENT WITH IMPROVED TERMINAL COLLAR HAVING INTERLOCK SECTIONS

[75] Inventors: Roger W. Helms, Beaver Falls; Donald R. Nutter, Cranberry Township, both of Pa.

[73] Assignee: Eaton Corporation, Cleveland, Ohio

[21] Appl. No.: 08/989,455

[22] Filed: Dec. 12, 1997

[51] Int. Cl.[6] .............................. H01H 1/00; H02B 1/04; H01R 4/28

[52] U.S. Cl. ......................... 361/634; 200/284; 439/810; 439/814

[58] Field of Search .................... 200/284; 361/634–640, 361/669–672, 822–824; 439/620–622, 776–789, 801–815

[56] References Cited

U.S. PATENT DOCUMENTS

| | | | |
|---|---|---|---|
| 3,066,277 | 11/1962 | Edmunds | 439/777 |
| 3,638,173 | 1/1972 | Middendorf et al. | 439/814 |
| 3,775,733 | 11/1973 | Ege | 439/814 X |
| 3,891,298 | 6/1975 | Yorgin et al. | 439/814 X |
| 4,213,669 | 7/1980 | Wittes et al. | 439/811 |
| 4,288,669 | 9/1981 | Grunert et al. | 200/284 X |
| 4,427,258 | 1/1984 | Mueller | 439/814 |
| 4,603,376 | 7/1986 | Maier | 200/284 X |
| 4,629,281 | 12/1986 | Kriiger | 439/791 |
| 4,809,132 | 2/1989 | Palmieri et al. | 361/634 X |
| 5,206,789 | 4/1993 | Barbry | 361/634 |
| 5,269,710 | 12/1993 | Donnerstag | 439/810 |
| 5,533,913 | 7/1996 | Boehm et al. | 439/810 |

*Primary Examiner*—J. R. Scott
*Attorney, Agent, or Firm*—Martin J. Moran

[57] ABSTRACT

A circuit breaker system having load and line terminals interconnectable with load and line conductors by way of a solderless collar has a central opening which encloses an overlapping portion of the internal load or line terminals and the associated load or line conductors. The collar has a set screw in the top thereof which is turned down on the overlapping terminal and conductor until a secure connection is made. The collar has a joint, which may be affected by the setscrew action associated with securing the external conductor with the internal terminal. The joint is T-shaped and is provided with vertical tabs on one portion thereof to prevent the weakest portion of the joint from rotating outwardly under the affects of the securing action and thus jeopardizing the strength of the joint.

13 Claims, 3 Drawing Sheets

CIRCUIT BREAKER ARRANGEMENT WITH IMPROVED TERMINAL COLLAR HAVING INTERLOCK SECTIONS

CROSS REFERENCE TO RELATED APPLICATIONS

The subject matter of this invention is related to U.S. application Ser. No. 08/864,104, now abandoned and entitled "Circuit Interrupter with Covered Accessory Case, Adjustable Under Voltage Relay, Self-Retaining Collar and One-Piece Rail Attachment", filed May 28, 1997 by Malingowski, et al., and assigned to the present assignee.

BACKGROUND OF THE INVENTION

1. Field of the Invention

Subject matter of this invention is related to circuit interrupters generally and more particularly to wire retainer collars.

2. Description of the Prior Art

Reference is made to U.S. Pat. No. 5,206,789 entitled "Terminal Assembly for A Circuit Breaker and Similar Apparatus" issued to Barbry on Apr. 27, 1993. The present invention is an improvement over the teachings of the '789 patent. Electrical circuit breakers are well know. It is necessary to interconnect external electrical line and load terminals to the circuit breaker terminals. One way of doing this is by utilizing a collar arrangement, which provides a solderless way of interconnecting the external load and line conductors with the main terminals of the circuit breaker. Basically the collar arrangement consist of electrically conductive material having a periphery which captures or encloses an overlapping arrangement of the internal terminal of the circuit breaker and the external line or load conductor as the case may by. A set screw arrangement is then provided in a threaded opening in the collar for turning down on the adjacent overlapping conductor and terminal for holding them in place. One problem with the prior art collar is the tendency for it to separate at its peripheral joint as the set screw is turned down onto the overlapping terminal and conductor. Obviously this is undesirable. It would be desirable, therefor, if a collar for a circuit breaker could be provided which did not easily separate when the set screw utilized therein was turned down upon the internal terminal an external conductor which the collar interconnects.

SUMMARY OF THE INVENTIONS

In accordance with the invention a circuit breaker system including a collar for interconnecting an electrical conductor with a terminal is taught. The collar includes a ribbon of inter-joined material for forming a periphery around the electrical conductor and terminal for securing them together. The first end of the ribbon has a male interlocking shape in a first plane. A second end of the ribbon has a complementary female shape in the same plane for accepting the male interlocking shape. The male interlocking shape and the complementary female shape cooperate to hold the first and second ends together in the first plane. The second end of the conductor has a male protrusion in the first plane and has a complementary female opening for accepting the protrusion in the first plane. The male protrusion and the complementary opening when joined resist rotational movement of the second end of the ribbon in the first plane when the periphery is put in a state of tension.

BRIEF DESCRIPTION OF THE DRAWINGS

For a better understanding of the invention, reference may be had to the preferred embodiment thereof shown in the accompanying drawings in which.

DETAILED DESCRIPTION OF THE DRAWINGS

Figure 1:
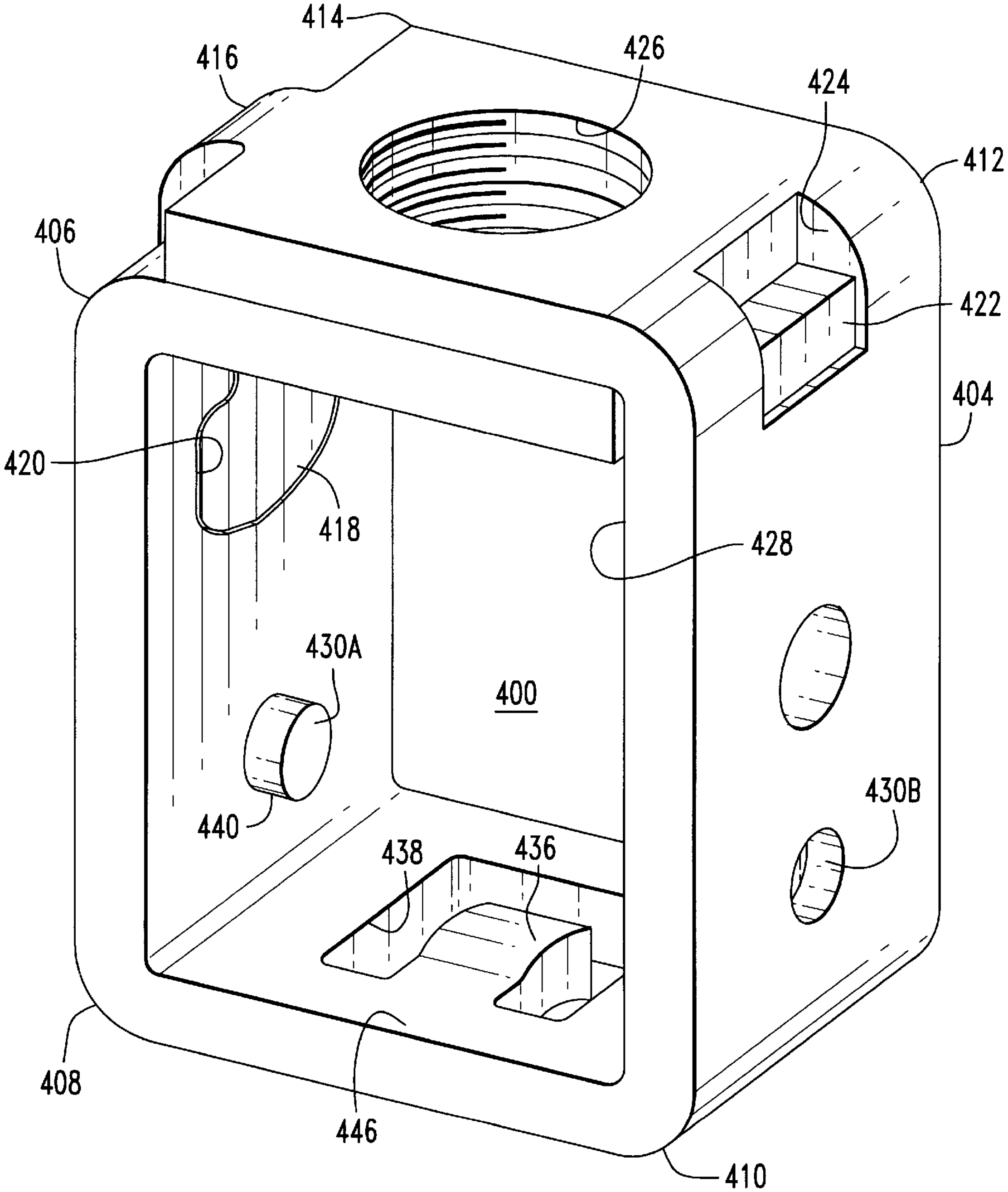
FIG. 1 PRIOR ART
FIG. 1 shows an orthogonal view of a prior art load or line terminal collar for a circuit breaker.
Figure 2:
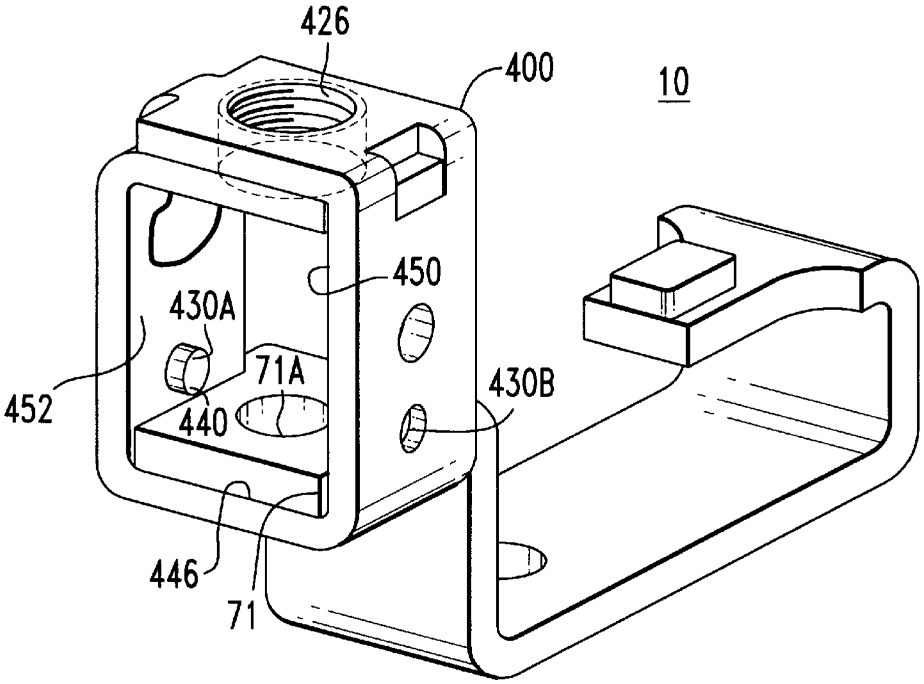
FIG. 2 PRIOR ART
FIG. 2 shows an orthogonal view of the collar of FIG. 1 disposed upon a line or load conductor.

Referring now to FIGS. 1 and 2, a self-retaining prior art collar 400 for a load or line conductor for a circuit breaker is depicted. The collar 400 is disposed, as shown in FIG. 2, on a line conductor 71 of a circuit interrupter 10. The collar 400 comprises a formed strip of rectangular cross-section, electrically conductive material, such as copper, folded over four times at 406, 408, 410 and 412 to form a hollow rectangular sleeve. One end, 414 of the rectangular member includes a portion of peninsular material 418 bent over at 416 which is fitted or dove-tailed into fit with an opening 420 of similar shape in the side of the wall defined by the corners 406 to 408. In a like manner a rectangular protrusion 422 depends outwardly from the horizontal section of the bent over material emanating from fold over 406 towards the right. This latter rectangular portion is interlocked with a key member or opening 424 in the fold region 412. This secure arrangement allows for a relatively strong collar member formed from a single unitary piece. There is provided at the top, a threaded opening 426 into which a threaded member (not shown) may be axially disposed for downward movement into the central enclosure 428 of the collar member 400 for compressing wires or conductors which may be inserted therein. The collar shown in FIG. 1 includes two side mounted protrusions or trapping members 430A and 430B which transversely protrude into the central opening 428. There is also included a sprung raised portion 436 peninsularly arranged in the middle of cutout 438. The raised portion 436 is adapted for fitting into a hole, as will be described later, in the line conductor 71 of the circuit interrupter 10.

Referring now to FIG. 2, the collar 400 is shown in a self-retained disposition on the line conductor 71. The line conductor 71 fits between the lower portion 440 of the dowel- like protrusions 430A and 430B which trap the rectangular cross-section of the line conductor 71 therebetween and between the inside bottom 446 of the collar 400. The protrusion 436 protrudes upwardly into the hole 71A in the line terminal 71 thus longitudinally fixing the relationship between the collar 440 and the conductor 71. The entrapping protrusions 430A and 430B prevent the vertical movement of the collar 440 relative to the conductor 71 as viewed in FIG. 2. Lateral movement is prevented by the location of the sidewalls shown, for example, at 450 and 452 in FIG. 2.

Figure 3:
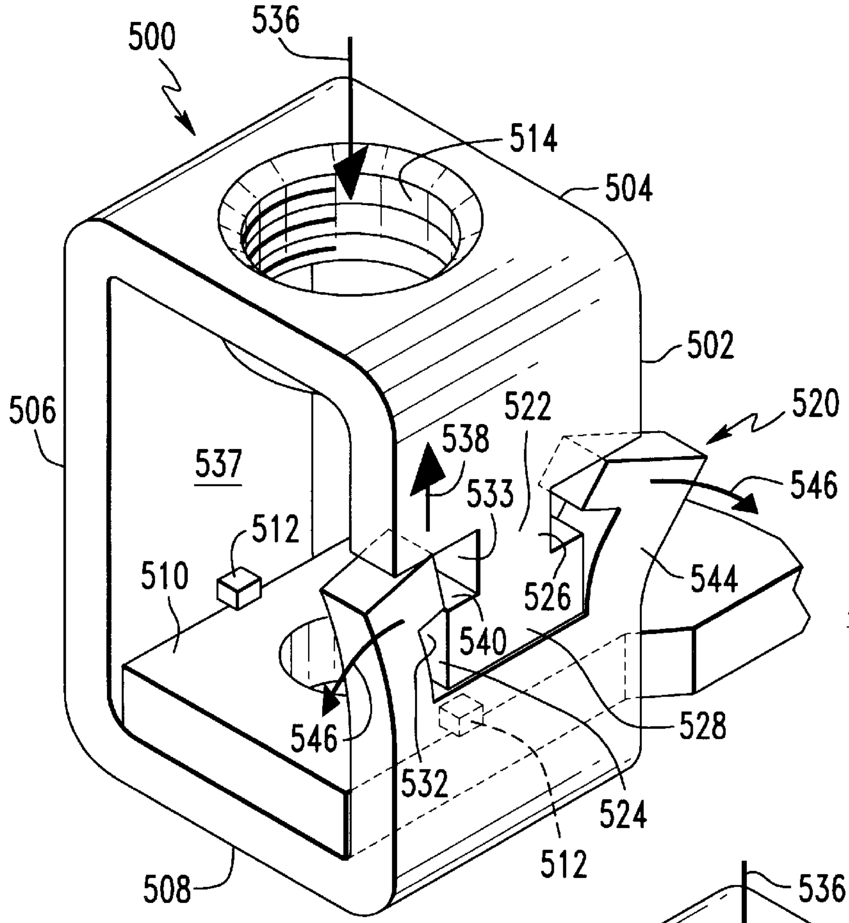
FIG. 3 PRIOR ART
FIG. 3 shows a different prior art collar then the one shown in FIGS. 1 and 2.

Referring now to FIG. 3, another prior art embodiment of a terminal collar 500 is depicted. Terminal collar 500 is made of a continuous ribbon of electrically conducted material formed into four sides 502, 504, 506 and 508. A line terminal 510 of the circuit breaker is disposed against the inside of the bottom 508 of the collar and held in place there by nibs 512. A threaded hole 514 is provided on the top 504 of the collar 500. In the side 502 there is provided a joint 520 which joins one end of the ribbon of conductive material with the other end of the ribbon of conductive material. One of the joint members comprises an inverted male T-shaped portion, composed of a downwardly projecting vertical bar 526 terminated in a horizontal projecting bar 528. There is also provided in the other end of the conductive material of the collar 500 a complementary female T-shaped opening 524. Female T-shape 524 comprises a horizontal open space 532 corresponding to the horizontal bar 528 and a vertical female space 533 corresponding to the male vertical bar 526. During construction the male T-shaped interlock 522 is fit periphery into the complementary female shape 524 to form an interlocked joint 520. As a set screw or similar device is threaded downwardly in the direction 536 in the threaded hole 514 to forcefully compress an external conductor (not shown) downwardly against the top of the line terminal 510 in the central region 537 of the collar 500, a force 538 of reaction is generated in the opposite direction tending to separate the joint 520. If the force 536 and its' reactive force 538 is greater then the metallurgical strength of the joint 520, the joint members comprising the enclosed parts 544 of the complementary T-shape 524 will begin to rotate outwardly in opposite directions 546 under the influence of the upward movement of the T-surface 540 of the male member 522. The narrow regions 544 defining the female horizontal shape 532 are the weakest parts of the joint 520 and have a tendency to bend outwardly in the direction 546 and to perhaps even shear off depending upon the relative strength of the force 538. The separation of the joint 520 depicted in the prior art collar of FIG. 3 is of course undesirable. It would be desirable to provide a collar having the advantages shown in the collar of FIG. 3, but which nevertheless did not separate or disintegrate at the joint 520 as the force 536 is applied to hold the overlapping line terminal 510 and conductors in the central region 537 thereof.

Figure 4:
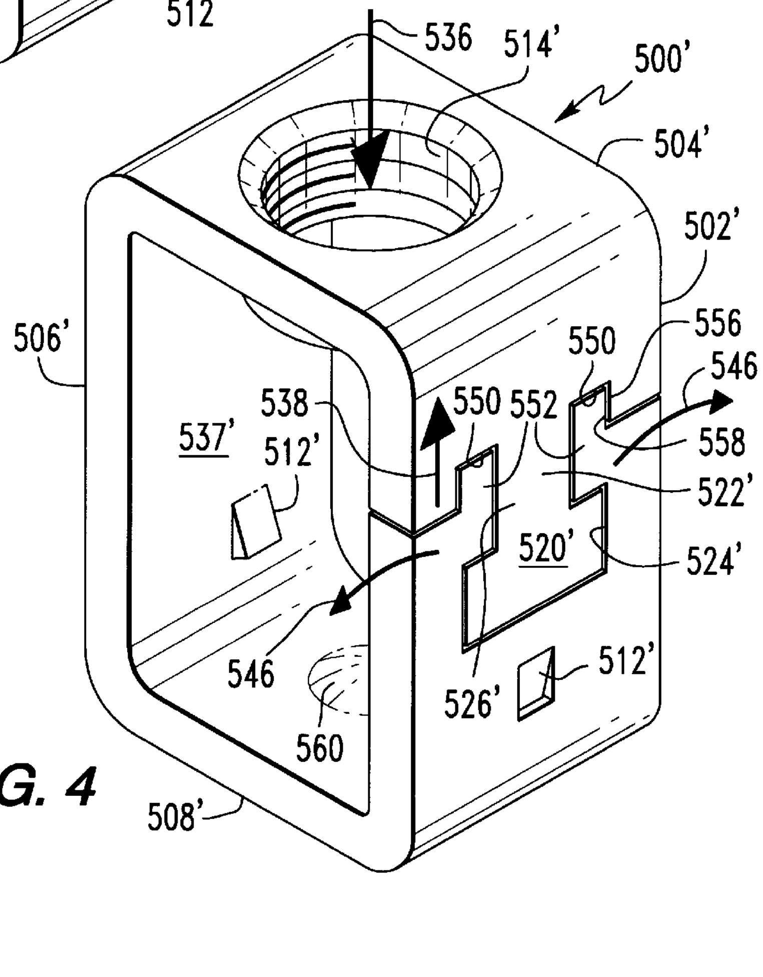
FIG. 4 shows a terminal collar of the kind embodied in the present invention.

Referring to FIG. 4, an improved collar embodying the teachings of the present invention is depicted. In the description described with respect to FIG. 4 those parts of the collar which are similar to those parts shown in FIG. 3 are represented by the same reference symbol having an additional identifying prime (') associated therewith. In this embodiment of the invention there are number of differences between the collar 500' of FIG. 4 and collar 500 of the prior art FIG. 3. One difference lies in the fact that the nibs 512' are constructed differently. They are punched-in portions of the sidewalls 506' and 502'. In the embodiment of FIG. 4 the line or load conductor 510 is not shown in order that a protruding, seating blister or bump 560 in the bottom wall 508' may be depicted. The line conductor 510, if inserted, would be inserted into the central opening 537' underneath the protruding nibs 512' and the upper side of the bottom portion 508' of the collar 500' until a complementary hole in the line terminal (not shown) captures and is seated by the bump 560. Another significant difference may be found in the female slots 550 provided in the upper portion of the sidewall 502' adjacent to the vertical bar 526' of the inverted male T 522'. In this embodiment of the invention, as a set screw or similar device (not shown) is threaded downwardly in the direction 536 in the manner described previously with respect to FIG. 3, rather than the external portions of the female complementary T-shape 524 rotating outwardly in the direction 546 as with apparatus of FIG. 3, the presence of the female slots 550 working in conjunction with complementary male tabs 552 at the region 556 prevents or minimizes rotation of the outer portions of the lower side 502' in the direction 546. The joint 520' as constructed is therefore even stronger than the joint 520 of FIG. 3 and appreciable resists destruction of the joint as a result of the reactive force in the direction 538 due to the turning of a set screw or downwardly in the direction 536.

Figure 5:
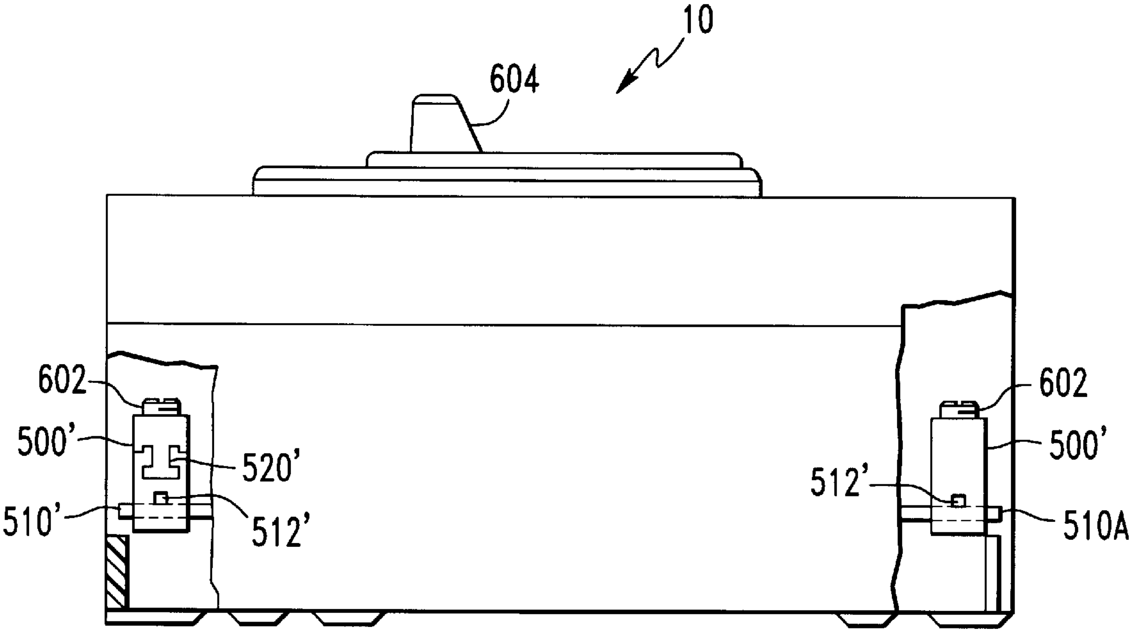
FIG. 5 shows a side elevation partially broken away of a molded case circuit breaker utilizing the collar arrangement of FIG. 4 on both the load and line terminals.

Referring now to FIG. 5, a circuit interrupter 10, partially cut away to show the arrangement of a pair of line and load terminal collars 500' for connection with a line terminal 510 and a load terminal 510A is depicted. The terminal 510 is disposed on the inside of the collar against the bottom thereof and is maintained therein by the presence of the nubs 512'. In each case a joint 520' similar to that shown in FIG. 4 is provided. In the embodiment of FIG. 5, the joint 520' for the collar 500' on the left is shown facing outwardly. The same joint is obscured from view in the collar 500' on the right. As the set screw 602 is turned downwardly against a conductor inserted into the collar against the upper portion of the load or line conductor 510 or 510A, the joint 520' is sufficiently strong to reduce destruction or deterioration thereof under the influence of the force provided by the set screw 602. In order to operate the circuit breaker 10, a handle 604 is provided to open and close the separable main contacts disposed within the circuit breaker in a disposition of continuity with the line and load terminals 510 and 510A.

What we claim as our invention is:

1. A collar for interconnecting an electrical conductor with the terminal of an electrical device, comprising:

a ribbon of interjoined material for forming a periphery around said electrical conductor and said terminal for securing them together, a first end of said ribbon having a male interlocking shape in a first plane, a second end of said ribbon having a complementary female shape in said first plane for accepting said male interlocking shape, said male interlocking shape and said complementary female shape cooperating to hold said first and second ends together in said first plane, said second end also having a male protrusion in said first plane, said first end also having a complementary female opening for accepting said male protrusion in said first plane, said male protrusion and said complementary opening when joined resisting rotation movement of portions of said second end of said ribbon in said first plane.

2. The combination as claimed in claim 1, wherein said material is electrically conducting.

3. A collar for interconnecting an electrical conductor with the terminal of an electrical device, comprising:

interjoined material forming a periphery around said electrical conductor and said terminal for securing them together, said interjoined material being interlocked in a first plane;

screw means penetrating said collar in a plane perpendicular to said first plane for forcing said electrical conductor and said terminal together against the inside of said collar, said forcing tending to separate said interjoined material at said interlock by rotating portions of said interlock in said plane away from each other; and said interlock having an ear in said plane which abuts against another portion of said interlock to resist said rotation of said portions of said interlock in said plane away from each other.

4. The combination as claimed in claim 3, wherein said material is electrically conducting.

5. A collar for interconnecting an one electrical conductor with another electrical conductor, comprising:

interjoined material forming a periphery around said two electrical conductors for securing them together, said interjoined material being interlocked in a first plane;

securing means penetrating said collar in a plane perpendicular to said first plane for forcing said electrical conductors against the inside of said collar, said forcing tending to separate said interjoined material at said interlock by rotating portions of said interlock in said plane away from each other; and said interlock having a protrusion in said plane which abuts against a portion of said interlock to resist said rotation of said portions of said interlock in said plane away from each other.

6. The combination as claimed in claim 5, wherein said material is electrically conducting.

7. An electrical circuit interrupter, comprising an insulating case;

separable main contacts disposed within said, insulating case;

one of said separable main contacts being interconnected with a terminal which in turn is interconnected with an electrical conductor with a collar;

said collar, comprising:

a ribbon of interjoined material for forming a periphery around said electrical conductor and said terminal for securing them together, a first end of said ribbon having a male interlocking shape in a first plane, a second end of said ribbon having a complementary female shape in said first plane for accepting said male interlocking shape, said male interlocking shape and said complementary female shape cooperating to hold said first and second ends together in said first plane, said second end also having a male protrusion in said first plane, said first end also having a complementary female opening for accepting said male protrusion in said first plane, said male protrusion and said complementary opening when joined resisting rotation movement of portions of said second end of said ribbon in said first plane.

8. The combination as claimed in claim 7, wherein said material is electrically conducting.

9. An electrical circuit interrupter, comprising an insulating case;

separable main contacts disposed within said insulating case;

one of said separable main contacts being interconnected with a terminal which in turn is interconnected with an electrical conductor with a collar;

said collar, comprising:

interjoined material forming a periphery around said electrical conductor and said terminal for securing them together, said interjoined material being interlocked in a first plane;

screw means penetrating said collar in a plane perpendicular to said first plane for forcing said electrical conductor and said terminal together against the inside of said collar, said forcing tending to separate said interjoined material at said interlock by rotating portions of said interlock in said plane away from each other; and said interlock having an ear in said plane which abuts against another portion of said interlock to resist said rotation of said portions of said interlock in said plane away from each other.

10. The combination as claimed in claim 9, wherein said material is electrically conducting.

11. An electrical circuit interrupter, comprising an insulating case;

separable main contacts disposed within said insulating case;

one of said separable main contacts being interconnected with a terminal which in turn is interconnected with an electrical conductor with a collar;

said collar, comprising:

interjoined material forming a periphery around said two electrical conductors for securing them together, said interjoined material being interlocked in a first plane;

securing means penetrating said collar in a plane perpendicular to said first plane for forcing said electrical conductors against the inside of said collar, said forcing tending to separate said interjoined material at said interlock by rotating portions of said interlock in said plane away from each other; and said interlock having a protrusion in said plane which abuts against a portion of said interlock to resist said rotation of said portions of said interlock in said plane away from each other.

12. The combination as claimed in claim 11, wherein said material is electrically conducting.

13. A collar for interconnecting an one electrical conductor with another electrical conductor, comprising:

interjoined material forming a periphery around said two electrical conductors for securing them together, said interjoined material being interlocked in a first plane;

securing means interacting with said collar in a plane perpendicular to said first plane for forcing said electrical conductors against the inside of said collar in a first direction, said forcing tending to separate said interjoined material at said interlock in a direction perpendicular to said first direction; and said interlock having a protrusion in said first plane which abuts against a portion of said interlock to resist said separation in said perpendicular direction.

* * * * *